Patented June 24, 1947

2,422,888

UNITED STATES PATENT OFFICE 2,422,888

PYRIMIDINE COMPOUNDS AND METHOD OF MAKING THE SAME

Francis Henry Swinden Curd and Francis Leslie Rose, Blackley, Manchester, England, assignors to Imperial Chemical Industries Limited, a corporation of Great Britain No Drawing. Application September 25, 1944, Serial No. 555,751. In Great Britain September 29, 1943

9 Claims. (Cl. 260—251)

This invention relates to new pyrimidine compounds and to processes for manufacturing the same. The said new compounds, which will be more closely defined hereinafter, may be described broadly as pyrimidines bearing in the 2-position an arylguanidino group free from acidic substituents and in the 4-position a hydroxy group and optionally bearing hydrocarbon substituents in the 5- and 6-positions. They are useful as intermediates in the manufacture of chemotherapeutic agents and particularly of the antimalarial agents of copending applications Ser. Nos. 555,750 and 555,752, of even date herewith.

It is an object of this invention to provide new pyrimidine compounds. A further object is to provide processes for making the same. A further object is to provide new intermediates for chemotherapeutic agents and processes for making the same. Further objects will appear hereinafter as the description proceeds. These and other objects are achieved by the following invention.

The said new compounds are 2-arylguanidino-4-hydroxy-pyrimidines wherein either or both of the 5- and 6-positions may be unsubstituted or substituted by a hydrocarbon radical and the aryl radical of the 2-arylguanidino group is unsubstituted or substituted by one or more simple non-acidic substituents such, for example, as hydrocarbon radicals (which themselves may optionally bear simple substituents and which may be attached to the aryl radical directly or through an oxygen or sulphur atom or through an imino, sulphonyl or carbonyl group), halogen atoms or cyano, nitro, amino, acyl-amino, alkoxy or carboalkoxy groups.

We make the said new compounds by a process comprising the interaction of the corresponding arylbiguanides, optionally substituted by one or more simple non-acidic substituents, with appropriate formylacetic esters optionally substituted by hydrocarbon radicals on the α- and/or β-carbon atoms. The reaction may be expressed by the following general equation:

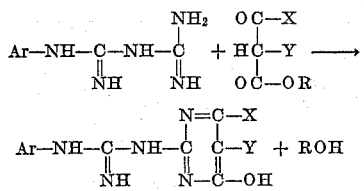

wherein Ar represents an aryl radical free of acidic substituents, X and Y are substituents selected from the group consisting of hydrogen and hydrocarbon radicals, while ROH represents the esterifying alcohol on the formyl acetic ester selected.

The reaction is conveniently carried out by bringing the reagents together in presence of a solvent such, for example, as ethanol. If desired, the solution may be heated to speed up the reaction, although in some cases this may give rise to side-reactions, so that unnecessarily high reaction temperatures should be avoided.

The arylbiguanide may be used either as the free base or in the form of a salt such as the hydrochloride; in the latter case it is preferable to have present an acid-binding agent such as sodium ethoxide or caustic soda.

As examples of formylacetic esters suitable for use in this process there may be mentioned the esters of formylacetic, acetoacetic, α-formylpropionic, α-formylbutyric, α-acetopropionic, α-acetobutyric, α-acetohexanoic, propionlyacetic, α-propionylpropionic, α-propionylbutyric, α-benzoylacetic, α - formyl - phenylacetic, α-formylphenylpropionic and α-formyl-cyclohexylacetic acids. The ethyl or methyl esters are the most convenient, but other esters may be used. Many of these substituted formylacetic acids are known compounds; others may be made by Claisin reaction between the appropriate esters or by direct alkylation of the appropriate acylacetic ester.

As examples of suitable arylbiguanides there may be mentioned the following: phenyl, o, m and p-chlorophenyl, o and p-methoxyphenyl, o-, m and p-tolyl, o, and p-bromophenyl, p-methylmercaptophenyl, 2:4-, 2:5-, 3:4- and 3:5-dichlorophenyl, 3:4- and 3:5-dimethylphenyl, 2-methyl-4-chlorophenyl, 3-chloro-4-methylphenyl, 3:5-dibromophenyl, 4-dimethylaminophenyl, p-nitrophenyl, p-cyanophenyl, p-carbomethoxyphenyl, p-ethoxyphenyl, p-n - butylphenyl, p - phenylphenyl, α- and β-naphthyl, 4-chloro-1-naphthyl, 6-bromo-2-naphthyl, 6-methoxy-2-naphthyl, p-iodophenyl, p-acetylaminophenyl, p-fluorophenyl, p-acetylaminophenyl, p-methylsulphonylphenyl and p - dimethylaminosulphonylphenyl biguanides. Some of these arylbiguanides are known. Many others are new compounds. They may be made by heating together in an aqueous medium equimolecular proportions of dicyanodiamide and a salt, for example, the hydrochloride, of the appropriate arylamine.

The following examples illustrate, but do not limit, the invention. The parts are by weight.

EXAMPLE 1

29.25 parts of p-bromophenylbiguanide hydrochloride (conveniently made by refluxing an aqueous solution of equimolecular proportions of p-bromoaniline hydrochloride and dicyanodiamide) and 14 parts of a 32 per cent aqueous solution of caustic soda are stirred together in 90 parts of ethyl alcohol at 20° C. After 15 minutes 13 parts of ethyl acetoacetate are added and the mixture is allowed to stand for 48 hours. The crystalline precipitate which forms is filtered off, washed with ethyl alcohol, then with water to dissolve out any sodium chloride, and finally dried at 100° C. It is 2-p-bromophenylguanidino-4-hydroxy-6-methylpyrimidine of M. P. 252–254° C. (uncorr.).

Starting from other arylbiguanides and condensing in the same manner with 13 parts of ethyl acetoacetate, the following further 2-arylguanidino-4-hydroxy-6 - methylpyrimidines are obtained, the data being tabulated for convenience. Table 1 shows the number of parts of the various arylbiguanides to be used as starting materials, whether used as salts or free bases and their melting points; the last column gives the melting points of the resulting 2-arylguanidino-4-hydroxy-6-methylpyrimidines.

Table 1

| Ex. No. | Biguanide used as starting material | | | | Pyrimidine compound M. P., ° C. |
|---|---|---|---|---|---|
| | No. of parts | Aryl group | Salt or base | M. P., ° C. | |
| 2 | 21.5 | Phenyl | HCl | 237 | 248–250 |
| 3 | 24.8 | p-Chlorophenyl | do | 246-247 | 268–270 |
| 4 | 22.7 | β-Naphthyl | Base | 180 | 259–262 |
| 5 | 33.95 | p-Iodophenyl | HCl | 234 | 278–280 |
| 6 | 24.8 | m-Chlorophenyl | do | 208 | 239 |
| 7 | 24.8 | o-Chlorophenyl | do | 239 | 252–254 |
| 8 | 23.85 | p-Cyanophenyl | do | 254–256 | 270 |
| 9 | 25.4 | p-Acetylamino-phenyl | Base | 166-168 | [1] 260–262 |
| 10 | 22.75 | m-Tolyl | HCl | 217–219 | 241–243 |
| 11 | 22.75 | o-Tolyl | do | 230–232 | 247–248 |
| 12 | 24.15 | 3:4-Dimethylphenyl | do | 223–224 | 246–248 |
| 13 | 25.85 | p-Nitrophenyl | do | 266–268 | 259–261 |
| 14 | 29.3 | p-Bromophenyl | do | 242–244 | 252–254 |
| 15 | 25.9 | p - Methylmercapto-phenyl | do | 220–222 | 250–252 |
| 16 | 28.9 | p-Phenyl-phenyl | Base | 202–204 | 230–233 |
| 17 | 22.7 | p-Tolyl | HCl | | 262–264 |
| 18 | 24.3 | p-Methoxyphenyl | HCl | | 253 |
| 19 | 26.3 | 4 - Chloro - 6 - methyl-phenyl | HCl | 256 | 252–255 |
| 20 | 28.4 | 3:5-Dichlorophenyl | HCl | [2] 180–181 | 270–272 |
| 21 | 23.2 | p-Fluorophenyl | HCl | | 258–260 |

[1] Dihydrate.
[2] As base.

Again starting from 24.8 parts of p-chlorophenylbiguanide and condensing in the same manner as described in Example 1 but with other β-keto esters, there are obtained the following 2-arylguanidino-4-hydroxypyrimidines, the data being tabulated for convenience.

in the art that many other embodiments and variations may be devised without departing from the spirit and scope thereof and accordingly it is to be understood that the invention is not in any way limited except as defined in the following claims.

In the claims below, the expression "acidic substituents" refers to radicals commonly recognized as ionizable, salt-forming, acid radicals, and typified by the carboxy, sulfonic acid and phenolic OH radicals. The term "aryl" is to be construed in a generic sense including aromatic hydrocarbon radicals and their substitution derivatives excepting, of course, such as may be explicitly excluded by the language of the claims.

We claim:

1. As new compounds, 4-hydroxypyrimidines bearing in the 2-position an arylguanidino group free from acidic substituents.

2. As new compounds, the pyrimidine derivatives of the formula

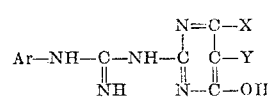

wherein Ar is an aromatic radical which contains not more than 10 carbon atoms in its cyclic skeleton and which is devoid of acidic substituents, while X and Y represent substituents selected from the group consisting of hydrogen and hydrocarbon radicals.

3. As new compounds, 2-arylguanidino-4-hydroxy-6-methylpyrimidines wherein the aryl radical is an aromatic radical which contains not more than 10 carbon atoms in its cyclic skeleton and is devoid of acidic substituents.

4. As new compounds, 2-arylguanidino-4-hydroxy-5:6-dialkylpyrimidines wherein the aryl radical is an aromatic radical which contains not more than 10 carbon atoms in its cyclic skeleton and is devoid of acidic substituents.

5. As new compounds, 4-hydroxy-6-methylpyrimidines bearing in the 2-position a p-substituted phenylguanidino group devoid of acidic substituents.

6. As new compounds, 4-hydroxy-6-methylpyrimidines bearing in the 2-position a naphthylguanidino group devoid of acidic substituents.

7. As a new compound 4-hydroxy-6-methyl-2 - (4' - chlorophenylguanidino) -pyrimidine, said compound having a probable structure corresponding to the following formula:

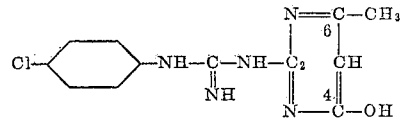

8. Process for the manufacture of 4-hydroxy-

Table 2

| Example Number | Ester used | Pyrimidine Compound obtained |
|---|---|---|
| 22 | Ethyl formylacetate, 11.6 parts | 2-p-chlorophenylguanidino-4-hydroxypyrimidine. |
| 23 | Ethyl α-formylphenylacetate, 19.2 parts | 2-p-chlorophenylguanidino-4-hydroxy-5-phenylpyrimidine. |
| 24 | Ethyl α-acetopropionate, 15.9 parts | 2-p-chlorophenylguanidino-4-hydroxy-5:6-dimethylpyrimidine, M. P. 266°. |
| 25 | Ethyl α-acetobutyrate, 17.3 parts | 2-p-chlorophenylguanidino-4-hydroxy-5-ethyl-6-methylpyrimidine, M. P. 261°. |
| 26 | Ethyl α-acetohexanoate, 19.8 parts | 2-p-chlorophenylguanidino-4-hydroxy-5-n-butyl-6-methylpyrimidine, M. P. 226°. |

Whereas the above description and examples illustrate many widely varied embodiments of the invention, it will be apparent to one skilled in the art that many other embodiments pyrimidines bearing in the 2-position an arylguanidino group free of acidic substituents, which comprises reacting the corresponding aryl-biguanide with an ester of a formyl-acetic acid of the general formula

wherein X and Y represent members of the group consisting of hydrogen and hydrocarbon radicals.

9. Process for the manufacture of 2-arylguanidino-4-hydroxy-6-methylpyrimidines devoid of acidic substituents which comprises the interaction of an arylbiguanide devoid of acidic substituents with an acetoacetic ester.

FRANCIS HENRY SWINDEN CURD.
FRANCIS LESLIE ROSE.